June 3, 1930.  O. H. PENNER  1,761,490
ADJUSTABLE DOUBLE ROLLER BEARING
Filed June 3, 1927  2 Sheets-Sheet 1

WITNESSES

INVENTOR.
OTTO H. PENNER
BY
ATTORNEYS.

June 3, 1930.  O. H. PENNER  1,761,490
ADJUSTABLE DOUBLE ROLLER BEARING
Filed June 3, 1927  2 Sheets-Sheet 2
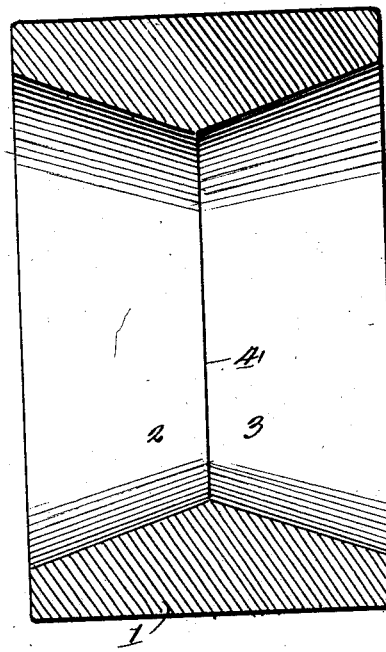
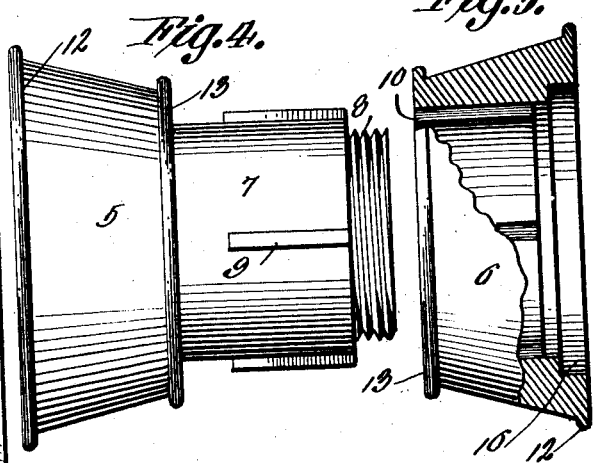
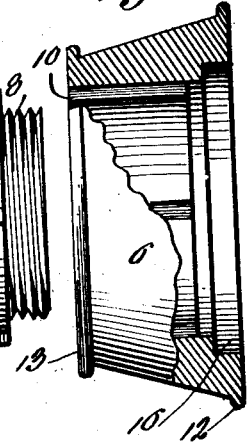
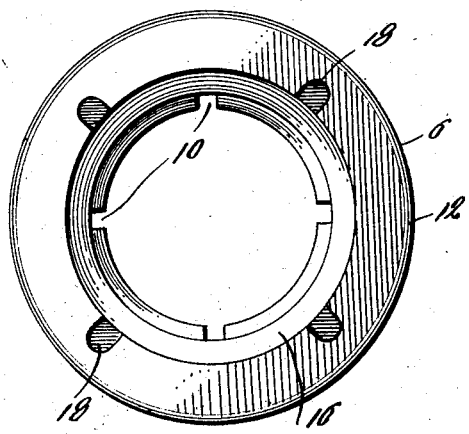
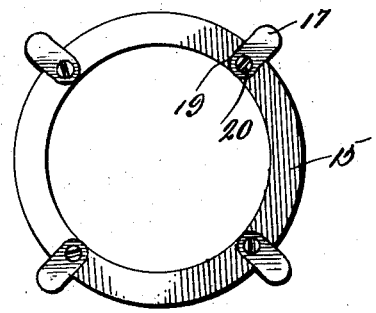
WITNESSES
INVENTOR.
OTTO H. PENNER
BY
ATTORNEYS.

Patented June 3, 1930

1,761,490

UNITED STATES PATENT OFFICE

OTTO H. PENNER, OF MINNEAPOLIS, MINNESOTA

ADJUSTABLE DOUBLE ROLLER BEARING

Application filed June 3, 1927. Serial No. 196,356.

This invention relates to a roller bearing construction and more particularly to an adjustable double roller bearing construction and has for its primary object the design and arrangement of the component parts so as to provide a double bearing action and adjustable to regulate the rolling action of the bearing.

Another object of the invention is the construction and arrangement of a pair of companion cone sections so as to be capable of relative adjustment for accomplishing more wear and further to facilitate the assemblage of the component parts.

Another object of the invention is the provision of an adjustable connection between the inner cone section in a very simplified construction in which the component parts are so connected and associated that the bearing structure is rigid throughout, so as to effectively take care of all strain to which the bearing is subject when in use.

Besides the above my invention is distinguished in the use of an interlocking connection between the companion cone sections so that these sections may be rapidly adjusted and substantially held in their proper adjusted position.

A feature of the invention is the novel construction of locking device which insures the positive locking of the parts after adjustment thereof.

With these and other objects in view, the invention will be better understood from the following detail description taken in connection with the accompanying drawings, wherein:—

Figure 3 is a vertical sectional view of the cup bearing,

Figure 4 is a side elevation of one of the cone sections,

Figure 5 is a similar view of the other cone section with parts,

Figure 6 is an end elevation of one of the cone sections, and

Figure 7 is an elevation of the locking device.

Figure 1:
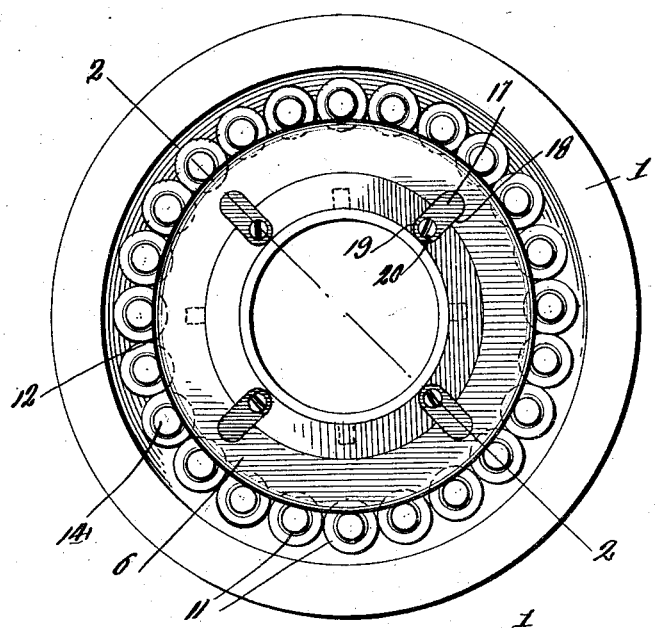
Figure 1 is a front elevation of the bearing.
Figure 2:
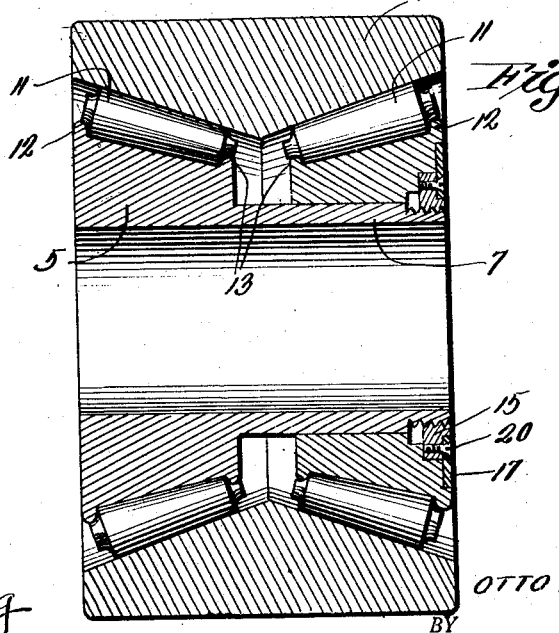
Figure 2 is a vertical sectional view on line 2—2 of Figure 1.

Again referring to the drawings illustrating one of the many constructions of my invention, the numeral 1 designates the cup bearing provided with a pair of companion bearing surfaces 2 and 3 inclining in opposite directions from a central point 4. Thus I provide a pair of bearing surfaces of tapering formation extending toward the sides of the cup so as to facilitate the insertion of the interior portion of the bearing. Coacting with the bearing surfaces 2 and 3 and having a tapering formation so as to parallel with the surfaces is a pair of cone sections 5 and 6, the former having projecting therefrom axially a cylindrical sleeve 7 that terminates in a threaded end portion 8. Arranged in spaced relation around the outer peripheral surface of the sleeve 7 is a set of splines 9 for adjustable engagement with the correspondingly shaped groove 10 in the bearing or cone section 6. Thus it will be appreciated that the section 6 may have axial and longitudinal adjustment around the sleeve 7 for varying the distance between the companion cone sections. This relative adjustment of the cone section determines the spacing of the outer surfaces of the cone section from the bearing surfaces 2 and 3 thereby properly positioning the bearing elements 11 and further providing a means for taking up for wear.

It will be noted that each of the cone sections 5 and 6 are provided with spaced annular retaining flanges 12 and 13 of the required height to be snugly received under the pintles 14 of the bearing elements 11 and further to have abutting relation with the ends of the bearing elements thereby assuring of proper association of the bearing elements with the cone sections and to facilitate the insertion of the cone sections into the cup 1. This construction and arrangement of parts also prevents jamming of the other elements and facilitates the smooth relative travel thereof. As far as I have proceeded it will be appreciated that cone section 5 with its bearing element 11 may be very readily slipped into position within the cup 1 with the relative surfaces of the bearings in proper contact with its associated bearing surfaces. With the cup and cone section 5 assembled as just described it requires very little effort to slide the cone section 6 on the sleeve 7 with the grooves of the former in sliding position with the splines of the latter. This relative adjustment of the parts bring the elements 11 into their proper position within the cup and for the purpose of retaining such relative position of the parts I have provided a locking device now to be described.

Referring to Figure 7 it will be noted that the locking device is a ring shaped nut 15 seated on the annular groove 16 formed in the cone section 6 so as to have the proper threaded engagement with the end portion 8 of the sleeve. By this arrangement tightening of the nut upon the threaded end portion 8 forces cone section 6 toward cone section 5 for changing their relative positions of the opposing surfaces of the cone sections and the cup 1 with the result that the contacting surfaces of the bearing element are brought into close arrangement with the associated surfaces of the cone sections and the cup 1. After final adjustments have been made of the various parts of the bearing it is of a decided advantage to lock the parts in this position and to accomplish this desired result I have illustrated a plurality of lock clips 17 detachably seated in recesses 18 formed in the cone section 6 and fixed in recesses 19 and the nut 15 by the set screw 20. This construction of lock device provides a snug formation on the end of the bearing and these clips 17 fit within the recesses 18 and 19 and are flush with the outer surface of the cone section 6 as well as the outer surface of the ring shaped nut 15, thereby producing a smooth flat surface upon the outer face of the bearing.

In concluding I wish to make it impressive that cone sections of various configuration and construction may be utilized in my invention so far as their design and construction are such as to enable a sliding and interlocking connection to be provided or relative adjustment of the parts. It is also to be understood that various other types of locking devices may be utilized for locking the various parts in an adjusted position although the lock device must be of design to accommodate final adjustment of the parts. In view of the fact that the various parts may be designed in various other manners than illustrated and associated in various other relations I wish it to be understood that I do not desire to be limited in any manner except as set forth in the following claim.

What I claim is:

A roller bearing comprising a cup, a pair of roller carrying sections mounted therein, one of said roller carrying sections slidably mounted upon the other roller carrying section, a ring threaded upon one section and engaging the other section for holding the sections in adjusted relation, one of the sections having a notch formed in the outer face thereof, and a lock clip carried by said ring and being flush with the outer surface thereof, said clip adapted to fit in said notch of one of the sections and extend flush with the outer face thereof for locking the sections against independent rotation.

In testimony whereof I affix my signature.

OTTO H. PENNER.